A. I. APPLETON.
CONDUIT FITTING.
APPLICATION FILED APR. 14, 1915.
1,289,073.
Patented Dec. 31, 1918.
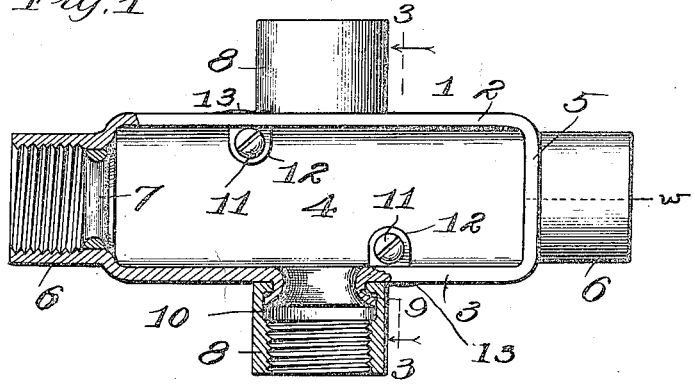
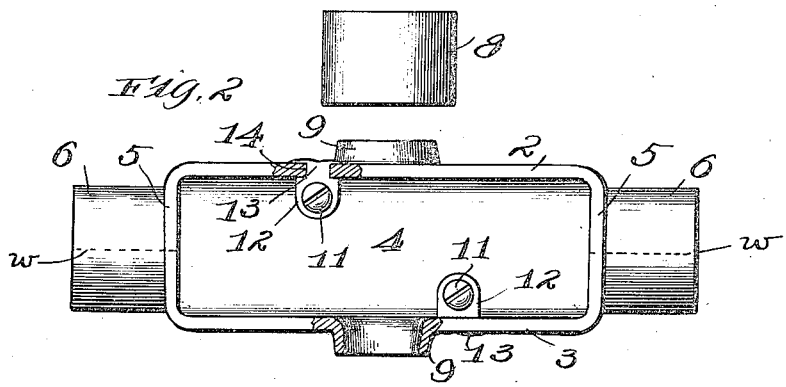
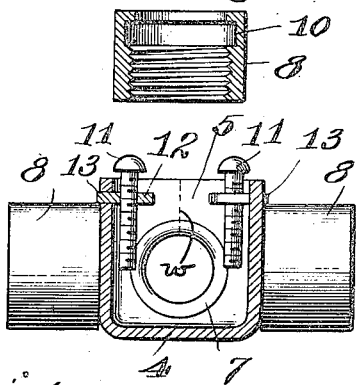 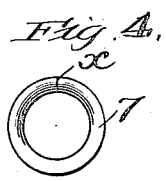
Witnesses:
Inventor
Albert I. Appleton
By Miller & Chindahl
Attys

UNITED STATES PATENT OFFICE.

ALBERT I. APPLETON, OF CHICAGO, ILLINOIS.

CONDUIT-FITTING.

1,289,073.  Specification of Letters Patent.  Patented Dec. 31, 1918.

Application filed April 14, 1915. Serial No. 21,194.

*To all whom it may concern:*

Be it known that I, ALBERT I. APPLETON, a citizen of the United States, residing at Chicago, in the county of Cook and State of Illinois, have invented certain new and useful Improvements in Conduit-Fittings, of which the following is a specification.

This invention relates to fittings intended to be secured into a line of conduit to provide outlets for the wires contained within the conduit. Such fittings comprise a box provided with one or more nipples which are screw-threaded to receive the ends of sections of conduits. Heretofore said fittings have been made of cast metal, the nipples being cast integral with the box. Cast metal fittings have proved unsatisfactory, as it is impracticable to form the nipples in perfect alinement. When such fittings are connected into a line of conduit, it is found that the line of conduit is not straight and in attempting to straighten the line, the fittings are often broken. Moreover, not infrequently it happens that temperature changes in a line of conduit will set up such strains as to cause breakage of one or more nipples. Furthermore, before using a cast metal box, it is necessary for the workman to feel of the surface at the inner end of each nipple to determine whether or not it is sufficiently smooth to prevent abrasion of the wires.

One of the objects of this invention is to produce a conduit fitting wholly of ductile sheet-metal wherein the box is formed from a single piece of sheet steel or other suitable ductile sheet metal and is provided with one or more nipples secured to the box in an advantageous manner. Such a box possesses ample strength to withstand the strains arising in use and in the rough handling to which this class of articles is subjected. Moreover, the fitting may be constructed so that the nipples are in perfect alinement, thereby improving the appearance of the finished work and obviating the necessity of expending time in straightening the conduit. At the same time, the operation of forming the fitting is very simple and hence the cost of manufacture is not prohibitive, but on the contrary is materially reduced. A fitting embodying my invention is also provided with a bushing or ring within the nipple to prevent abrasion of the wires.

In the accompanying drawings, Figure 1 is a face view of a conduit fitting embodying the features of my invention, with parts in section. Fig. 2 is a similar view illustrating the manner of securing to the box nipples formed separately therefrom. Fig. 3 is a sectional view taken in the plane of dotted line 3—3 of Fig. 1. Fig. 4 is a detail view of the anti-friction bushing or ring.

The fitting comprises a box 1 of suitable size and shape. The box herein shown, by way of example, comprises two side walls 2 and 3, a bottom wall 4, and end walls 5. The fitting further comprises two alined nipples 6, each projecting outwardly from one of the end walls 5. The walls 2, 3, 4 and 5 and the nipples 6 are formed from an integral piece of ductile sheet-metal, such as sheet steel. In such forming operation the metal is bent on lines extending longitudinally of two opposite edges of said piece of sheet metal to form the sides and bottom walls of the box and the side walls of the nipples, and on lines substantially transversely of said edges to form the end walls of said box which extend radially outward from said nipples; and said edges are brought into engagement with each other at the top side of the fitting on a line extending centrally through the top side of the nipples 6, and also centrally of the end walls 5 in that portion thereof which extends upwardly from the nipples 6. After the fitting has been formed up out of the sheet, the abutting edges of the sheet are welded together by any suitable process, so as to produce a fitting which is seamless throughout. The position of the abutting edges prior to the welding operation is indicated by the dotted lines *w* in Figs. 1, 2 and 3.

A bushing or ring 7 is driven into the inner end of each nipple 6 and fits tightly therein. The ring 7 is preferably formed from a piece of half-round stock, the ends of the piece abutting at *x*, as shown in Fig. 4. Thus the outer periphery of the ring 7 is cylindrical to fit within the nipple, while the inner periphery of the ring is transversely rounded as shown in Fig. 1, to provide a smooth bearing surface upon which the insulated wires may bear.

In Figs. 1 and 2 is shown a preferred manner of securing to the box nipples formed separately therefrom. Herein I have shown such a nipple 8 upon each of the side walls. The nipple 8 is preferably machined out of steel so as to be true and accurate and of ample strength. The outer end of the nipple is herein shown as screw-threaded. In order to secure the nipple 8 to the side wall, I form up from the material of the wall an annular flange 9 which defines an opening communicating with the interior of the box. The flange 9 is adapted to extend within the inner end of the nipple 8 and to be expanded into an internal annular groove 10 in the nipple. It will be seen that the flange 9 acting in conjunction with the grooved portion 10 provides a very strong connection between the box and the nipple.

The junction of the inner surface of the flange 9 with the inner surface of the side wall is rounded so as to provide a smooth bearing surface for the wires.

The front side of the box may be closed in any ordinary or preferred manner, no closure or cover being herein illustrated. The closure may be secured in place by any suitable means, as for example, by means of screws 11 extending through the closure and into lugs 12 upon the box 1. In the form herein shown, the lugs 12 are located within the box and are formed separately from the box, each lug having a securing portion 13 which is riveted into an opening 14 in one of the side walls of the box.

It will be seen that the box herein disclosed is of ample strength, that the nipples 6 may be formed in perfect alinement, and that the nipples 8 also may be perfectly alined with each other.

I claim as my invention:

A conduit fitting comprising a sheet-metal box having an integral annular outwardly extending flange, and a nipple, said flange being expanded into engagement with said nipple, the inner surface of the inner portion of said flange being rounded.

In testimony whereof, I hereunto set my hand in the presence of two witnesses.

ALBERT I. APPLETON.

In the presence of—
MARGARET H. MOON,
C. A. BLOOM.